(12) United States Patent
Takatani et al.

(10) Patent No.: US 7,363,003 B2
(45) Date of Patent: Apr. 22, 2008

(54) MOBILE COMMUNICATION NETWORK USING MOBILE STATION WITH RELAY-FUNCTION AND METHOD FOR REWARDING RELAY ACTIVITIES OF MOBILE STATION

(75) Inventors: Yukihiro Takatani, Cannes (FR); Naomichi Nonaka, Yokohama (JP); Masato Hayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 132 days.

(21) Appl. No.: 10/499,718

(22) PCT Filed: Dec. 21, 2001

(86) PCT No.: PCT/EP01/15395

§ 371 (c)(1), (2), (4) Date: Apr. 14, 2005

(87) PCT Pub. No.: WO03/055246

PCT Pub. Date: Jul. 3, 2003

(65) Prior Publication Data

US 2005/0227616 A1 Oct. 13, 2005

(51) Int. Cl.
*H04B 7/185* (2006.01)

(52) U.S. Cl. .................. 455/13.1; 455/11.1; 455/406; 455/41.2

(58) Field of Classification Search ........... 455/11.1, 455/13.1, 466, 41.2, 567, 569.1, 569.2, 556.1, 455/557, 550.1, 525, 406–409; 370/338; 379/114.22, 114.23, 114.27, 114.28; 705/32, 705/77

See application file for complete search history.

(56) References Cited

U.S. PATENT DOCUMENTS

| | | | | |
|---|---|---|---|---|
| 5,504,935 A | * | 4/1996 | Vercauteren | 455/438 |
| 5,570,354 A | * | 10/1996 | Simon | 370/273 |
| 5,850,593 A | | 12/1998 | Uratani | |
| 6,564,047 B1 | * | 5/2003 | Steele et al. | 455/405 |
| 2007/0026857 A1 | * | 2/2007 | Kotzin | 455/426.1 |

FOREIGN PATENT DOCUMENTS

| | | |
|---|---|---|
| DE | 199 61 595 A1 | 6/2001 |
| JP | 7-245581 | 9/1995 |
| JP | 9-83528 | 3/1997 |
| JP | 2000-31895 | 1/2000 |
| JP | 2001-169336 | 6/2001 |
| JP | 2001-251366 | 9/2001 |
| JP | 2001-333222 | 11/2001 |
| WO | WO 00/38443 | 6/2000 |
| WO | WO 01/22757 A1 | 3/2001 |
| WO | WO 01/62026 A1 | 8/2001 |

OTHER PUBLICATIONS

G. Neonakis Aggélou et al., "On the Relaying Capability of Next-Generation GSM Cellular Networks", IEEE Personal Communications, vol. 8, No. 1, Feb. 2001, pp. 40-47.

* cited by examiner

*Primary Examiner*—Matthew Anderson
*Assistant Examiner*—Dominic E. Rego
(74) *Attorney, Agent, or Firm*—McDermott Will & Emery LLP

(57) ABSTRACT

A GSM network (1) includes a base station (2). A first mobile terminal (5) is outside a region of coverage. Using Bluetooth network, a second terminal (6) relays signals between the first terminal and the base station. The second terminal is awarded credit for relaying the signals.

7 Claims, 8 Drawing Sheets

|  | | User ID 1 | User ID 2 | · · · |
|---|---|---|---|---|
| 32 | Communication Charges | 10 | 6 | · · · |
| 33 | Relay Points | 5 | 0 | · · · |

30, 31

|  | | Relay 1 | Relay 2 | · · · |
|---|---|---|---|---|
| 36 | ID of Source Terminal | +44 7777 111 000 | 100.256.256.0 | · · · |
| 37 | ID of Destination Terminal | +44 7777 333 000 | 101.256.256.0 | · · · |
| 38 | Start Time | 15:57:43 | 07:12:52 | · · · |
| 39 | EndTime | 16:02:38 | 07:13:11 | · · · |
| 40 | ID of Relay Terminal 1 | +44 7777 222 000 | 101.256.256.0 | · · · |
| 41 | ID of Relay Terminal 2 | <Empty> | 101.256.256.0 | · · · |
|  | · · · | · · · | · · · | · · · |

34, 35

MOBILE COMMUNICATION NETWORK USING MOBILE STATION WITH RELAY-FUNCTION AND METHOD FOR REWARDING RELAY ACTIVITIES OF MOBILE STATION

FIELD OF THE INVENTION

The present invention relates to a mobile communications network.

BACKGROUND ART

A fixed communication network generally allows data or voice to be communicated between fixed terminals. An example of such a network is a public switched telephone network (PSTN) in which subscribers communicate using fixed telephone sets. Other examples include wired local-area networks (LANs) and wide-area networks (WANs), which are mainly used for transmission of data between computers. Fixed communication networks tend to restrict mobility of the users. If the user moves, they often have little choice but to disconnect their terminal from the network and reconnect at a different location. This is inconvenient for the user since network connection is temporarily lost. Moreover, network reconnection is not without its problems, particularly as it requires a connection point at the new location.

A mobile communication network helps to overcome these problems. An example of such a network is a public land mobile network (PLMN) such as the global system for mobile communication (GSM) network. Mobile terminals exchange signals with geographically-spaced base stations included in the network using radio signals. This allows the user to make and receive calls within a large area, even while moving. Mobility is achieved not only because wireless connections are used, but also because the mobile terminal is dynamically allocated a suitable base station. Thus, if the user is moving, a connection to one base station can be dropped and a new connection to another base station can established automatically so as to provide seamless coverage.

Mobile communication networks and mobile terminals are becoming increasingly common. For example, so-called $2^{nd}$ generation mobile telecommunication systems, such as GSM networks, are being replaced by $3^{rd}$ generation systems, such as universal mobile telecommunications standard (UMTS) networks. Moreover, users are becoming more reliant on their mobile terminals. Therefore, it is important that users are able to access the mobile communications network freely.

However, access can be restricted by the connections provided by base stations. For example, at a physical level, a radio link between the terminal and the base station may be of poor quality. This can happen when the user is located indoors. Alternatively, at a resource level, the base station may not be able to provide sufficient channels to mobile terminals requiring service. This often occurs when a large number of people gather at one place, for example at a sports stadium.

A solution to this problem is to provide additional base stations. However, this solution is expensive and relies upon being able to find suitable sites for the additional base stations.

Another solution is to employ mobile terminals as relays. For example, "On the Relaying Capability of Next-Generation GSM Cellular Networks" by George Neonakis Aggélou and Rahim Tafazolli, pp. 40-47, IEEE Personal Communications (February 2001) describes a terminal which is able to relay data using an ad-hoc GSM (A-GSM) network.

The present invention seeks to provide an improved mobile communications network for mobile terminals.

SUMMARY OF THE INVENTION

According to the present invention there is provided a mobile communications network for mobile terminals including a fixed station for exchanging signals with a first mobile terminal, a second mobile terminal configured to relay signals between said fixed station and said first mobile terminal wherein the network is configured to store information relating to use of the second mobile terminal as a relay.

This has the advantage that use of the second mobile as a relay may be monitored and rewarded.

The network may be configured to store or continue to store said information subsequent to completion of said relay. The network may include a server wherein said information is stored at said server. The information may be stored at the second mobile terminal.

The information may include a value of credit for relaying said signals. The credit may be redeemable. The network may be configured to provide said second mobile terminal with a service in response to redemption of said credit.

The network may include a subsidiary mobile communications network for relaying said signals between the fixed station and said first mobile network. The second mobile terminal may include a router for forwarding signals between said fixed station and said first mobile terminal. The router may be configured to operate according to Internet Protocol.

The network may include a third mobile terminal configured to relay signals between said fixed station and said first mobile terminal.

The network may be configured to store information relating to previous use of said second mobile as a relay. The network may be configured to accumulate information relating to use of said second mobile as a relay.

According to the present invention there is also provided a method of mobile communication in a mobile communications network including a fixed station for exchanging signals with a first mobile terminal, the method comprising using a second mobile terminal to relay signals between said fixed station and said first mobile terminal and storing information relating to use of the second mobile as a relay.

According to the present invention there is still further provided a mobile terminal for communication with a fixed station included in a mobile communications network, said mobile terminal being configured to relay signals between said fixed station and another mobile terminal and to provide information to said network relating to its use as a relay.

The terminal may include a first wireless interface for communicating with said fixed station. The terminal may include a second, different wireless interface for communicating with said other mobile terminal.

According to the present invention there is yet further provided a server associated with a mobile communications network for storing information relating to mobile terminals, said server configured to store relay information in response to a first mobile terminal exchanging signals with a fixed station included in said network via a second mobile terminal.

According to the present invention there is still further provided a method, in a mobile communications network, of rewarding a first mobile terminal for relaying signals between a second mobile terminal and either a third mobile terminal or a fixed station, the method comprising awarding credit to said first mobile terminal, wherein said credit is exchangeable for money or money's worth.

The money's worth may include provision of communication service.

According to the present invention there is also provided a mobile communications network for mobile terminals including a first mobile terminal for relaying signals between a second mobile terminal and either a third mobile terminal or a fixed station, the network being configured to award credit to said first mobile terminal, wherein said credit is exchangeable for money or money's worth, so as to reward said first mobile terminal for relaying said signals.

The network may be configured to store information relating to said credit awarded.

According to the present invention there is further provided a server associated with a mobile communications network which includes a first mobile terminal for relaying signals between a second mobile terminal and either a third mobile terminal or a fixed station, the server being configured to award credit to said first mobile terminal, wherein said credit is exchangeable for money or money's worth, so as to reward said first mobile terminal for relaying said signals.

According to the present invention there is also provided a mobile terminal for use in mobile communications network and for relaying signals between another mobile terminal and either yet another mobile terminal or a fixed station, said terminal being configured to award itself or be awarded credit for relaying said signals, wherein said credit is exchangeable for money or money's worth.

According to the present invention there is provided a method, in a mobile communications network, of rewarding a first mobile terminal for relaying signals between a second mobile terminal and either a third mobile terminal or a fixed station, the method comprising extending call-time of said first mobile terminal.

According to the present invention there is provided a method of operating a mobile communications network including a first mobile terminal for relaying signals between a second mobile terminal and either a third mobile terminal or a fixed station, the method comprising rewarding the first mobile terminal for relaying said signals with increased network access.

The rewarding of the first mobile terminal with increased network access may comprise increasing call-time or data volume available to the first mobile terminal.

BRIEF DESCRIPTION OF THE DRAWINGS

Embodiments of the present invention will now be described, by way of example, with reference to the accompanying drawings in which.

PREFERRED EMBODIMENTS OF THE INVENTION

Figure 1:
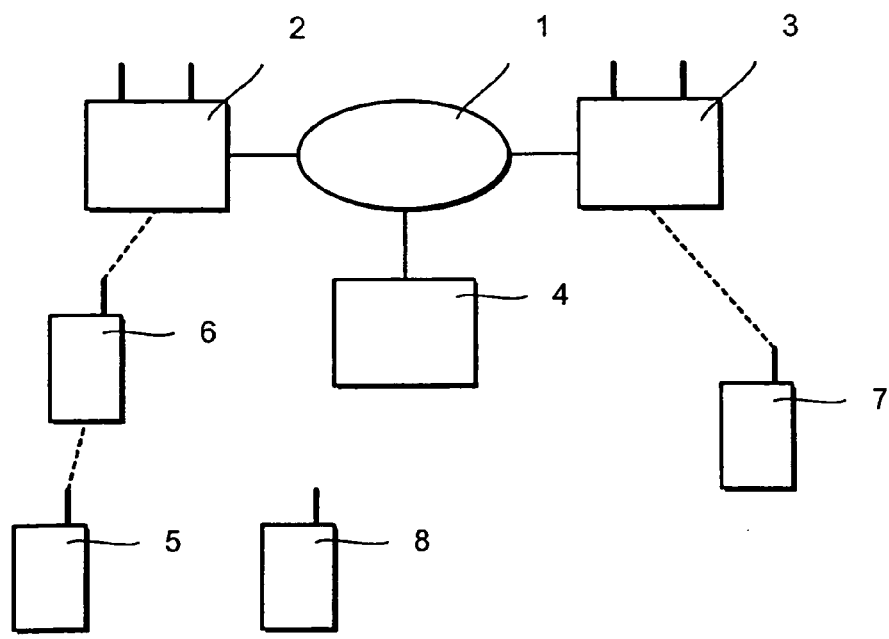
FIG. 1 shows a mobile communications network and mobile terminals according to a first embodiment of the present invention.

Referring to FIG. 1, in a first embodiment of the present invention, a mobile communications network 1 includes first and second base stations 2, 3. In this example, the network 1 is a public land mobile network (PLMN), such as a GSM network. The network 1 includes a server 4 for logging network use and will be described in more detail later.

A description of a GSM network can be found in "The GSM System for Mobile Communications" by Michel Mouly and Marie-Bernadette Pautet (Cell & Sys, Palaiseau, 1992).

First, second, third and fourth mobile terminals 5, 6, 7, 8 are suitable for use with the network 1. Each terminal 5, 6, 7, 8 can be used to communicate with other mobile terminals or, via an additional fixed communications network (not shown), with fixed terminals (not shown). For example, the fixed communications network can be a public switched telephone network.

A problem can sometimes arise that the first mobile terminal 5 is temporarily unable to use the communications network 1. There may be two reasons for this:

Firstly, the terminal 5 may be unable to use the network 1 because wireless signals received at the terminal 5 from a base station or those received at a base station from the terminal 5 are too weak. This usually occurs if the terminal 5 is located outside an area of coverage provided by the communications network's base stations or if the terminal 5 is located inside a building. Interference from another source can also render wireless signals unusable, i.e. the signals are too noisy.

Secondly, the terminal 5 may not be able to use the network 1 in that, despite there being strong enough signals, there is no communication channel available. For example, the terminal 5 may be located within an area of coverage provided by a third base station (not shown) which has already allocated all its communications channels to other mobile terminals. This often occurs if there is a high density of mobile terminals.

A solution to this problem is to employ the second mobile terminal 6 as a relay. The second terminal 6 effectively expands coverage provided by the network 1. The first mobile terminal 5 benefits from this arrangement since it is provided with service that it would otherwise not have. The second mobile terminal 6 can also benefit from this arrangement by being "paid" for use of its resources. As will be explained in more detail later, more than one mobile terminal can be used as a relay.

Figure 2:
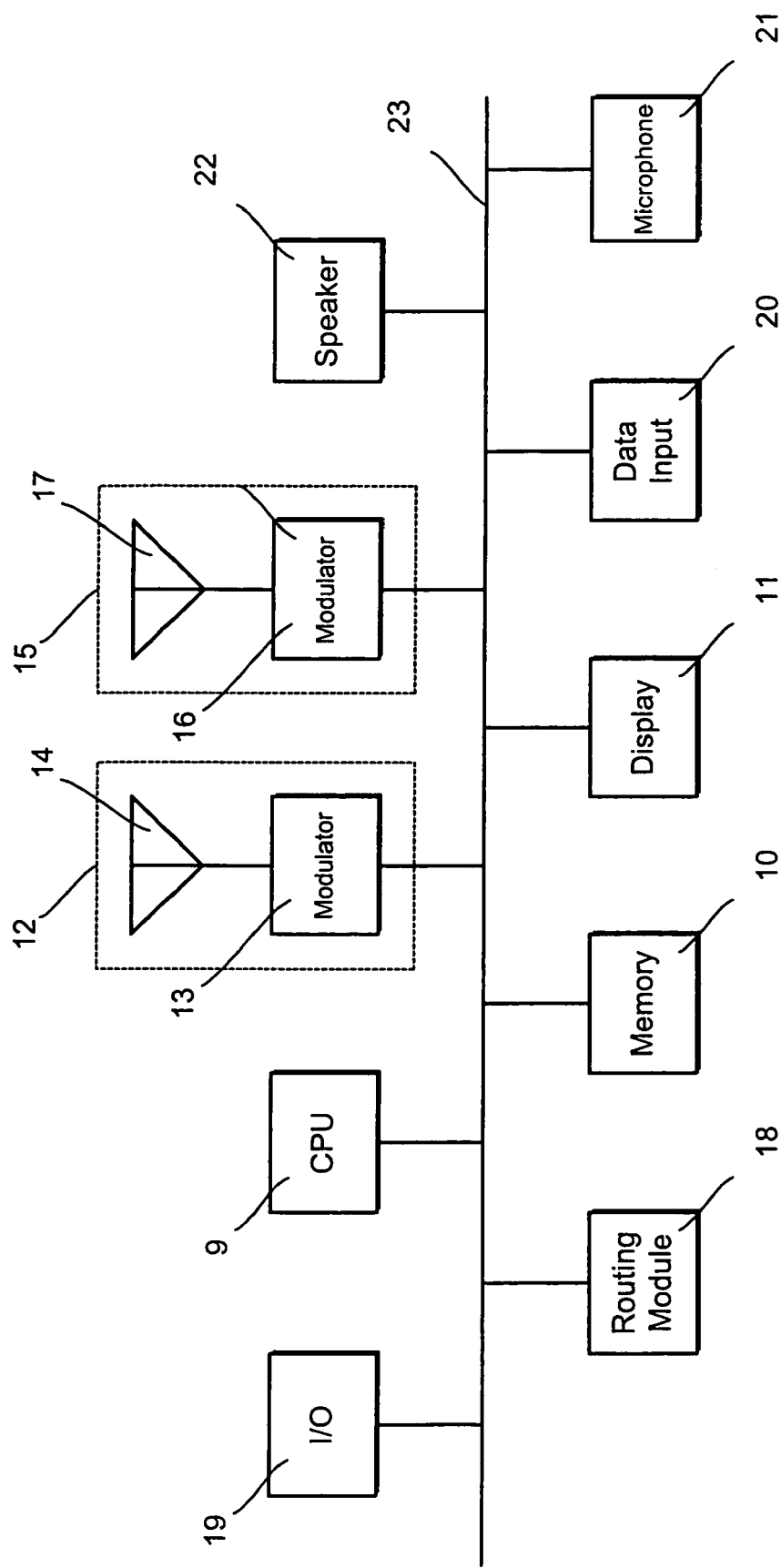
FIG. 2 is a schematic block diagram of a mobile terminal shown in FIG. 1.

Referring to FIG. 2, each mobile terminal 5, 6, 7, 8 includes a CPU 9, memory 10, display 11, first wireless interface 12 which comprises a modulator 13 and an antenna 14, second wireless interface 15, which comprises a modulator 16 and an antenna 17 and a routing module 18 for routing data to one of the wireless interfaces 12, 15. The terminals 5, 6, 7, 8 may also include an input/output 19 for exchanging data over wired networks (not shown), a data input 20, such as keypad or touch sensitive screen, a microphone 21 and a speaker 22. Data is exchanged between these elements 10, 11, 13, 16, 19, 20, 21, 22 using a bus 23.

The first wireless interface 12 is configured to exchange signals with the mobile communications network 1, which in this case is a GSM network. The second wireless interface 14 is configured to exchange signals through a subsidiary mobile communications network (not shown). In this example, the subsidiary network is an ad-hoc wireless network according to the Bluetooth™ specification. Thus, the subsidiary wireless interface may comprise a Bluetooth transceiver chip. In this example, coverage provided by the network 1 is greater than the subsidiary network. For example, a GSM base station may provide coverage in a cell with a radius of a few kilometers provided there are no obstacles. Bluetooth transceiver chips typically have a range less than a hundred meters. However, users often are located indoors where GSM network coverage is poor, but connection to at least one Bluetooth chip is possible. Routing is conducted according to Internet Protocol (IP).

It will be appreciated that other wireless networks and corresponding interfaces can be used. However, the network 1 and the subsidiary network can be one and the same and so a single wireless interface could be used.

Details relating to GSM can be found in "The GSM System for Mobile Communications" supra.

A system specification (Version 1.0) and a system overview may be found on the world-wide web at www.bluetooth.org or obtained from Bluetooth SIG, c/o Daniel Edlund, facsimile number +46 70 615 9049.

Figures 3, 4, 5:
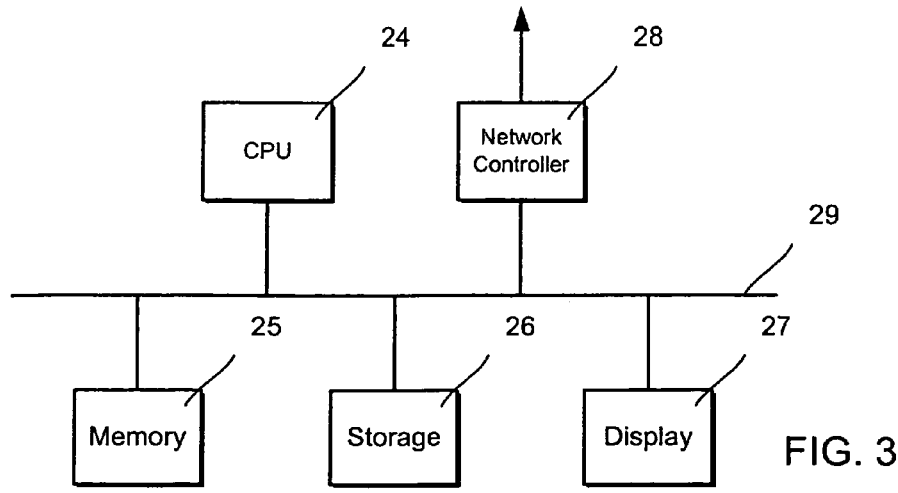
FIG. 3 is a schematic block diagram of a server shown in FIG. 1.
FIG. 4 illustrates a first type of table held by the server of FIG. 1.
FIG. 5 illustrates a second type of table held by the server of FIG. 1.

Referring to FIG. 3, the server 4 monitors and records use of terminals 5, 6, 7, 8 as and when they are used to relay signals. The server 4 includes a CPU 24, memory 25, storage 26, such as a hard-disk drive, and a network controller 28, which exchange data through a bus 29.

Referring to FIG. 4, storage 26 holds a user database 30 including information relating to each user registered to use the network 1. The user information includes user ID 30, communications charges incurred 32 and credit 33 accumulated arising from use of the mobile terminal as a relay. Credit may be awarded according to different criteria, such as the length of time of a terminal is used as a relay, a number of packets passing through the terminal, a number of times the terminal is used as a relay and/or power consumed. Credit 33 may be offset against charges, used for increased network access, used to obtain gifts or acquire some other benefit. Network access may be increased according to time and/or volume. It includes providing free calls, increased call-time and increased data volume. Charge offset includes providing rate discounts. Thus, there is an incentive for a user to allow their mobile terminal to be used as a relay.

Credit information 33 may also be held in memory 10 (FIG. 2) of each respective mobile terminal 5, 6, 7, 8. Credit information 33 can be updated periodically, following a relay or on-demand. This allows the user to find out how many points 33 have been accumulated.

Referring to FIG. 5, storage 26 also holds a relay information table 34 including information relating to communication sessions in which one or more mobile terminals are used as a relay. The session information includes a session number 35, the identities of the terminals 36, 37, start and end times 38, 39 and identities of mobile terminals used as relays 40, 41. It will be appreciated that other information may be stored.

A process by which the second mobile terminal 6 is used to relay signals between the first mobile terminal 5 and the first base station 2 will now be described.

Figure 6:
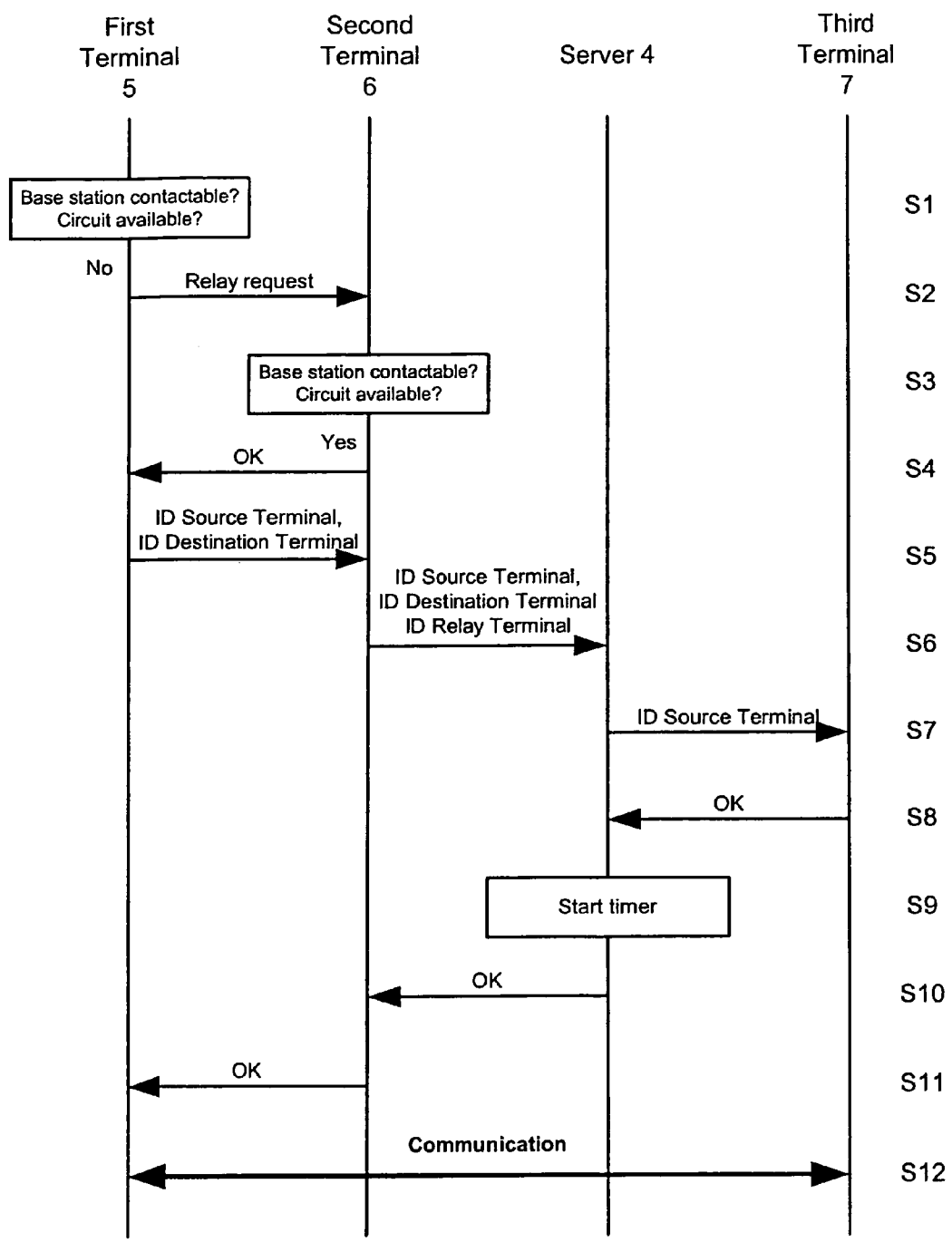
FIG. 6 is a process flow diagram showing a first procedure by which a first terminal, using a second terminal as a relay, is connected to a third terminal.

Referring to FIG. 6, the first mobile terminal 5 attempts to establish contact with the third mobile terminal 7 through the mobile communications network 1. Thus, in this case the first mobile terminal 5 is deemed to be a source terminal and the third mobile terminal 7 is taken to be a destination terminal. The first terminal 5 establishes whether a base station 2, 3 is contactable and, if so, whether a communication channel is available (step S1). If either limb of this test fails, then the first mobile terminal 5 establishes whether another mobile terminal 6, 7, 8 is prepared and able to act as a relay. Using the subsidiary communications network (not shown), the first mobile terminal 5 establishes a connection with the second mobile terminal 6 and sends a relay request (step S2). The second mobile terminal 6 establishes whether a base station 2, 3 is contactable and, if so, whether a communication channel is available (step S3). In this case, the second mobile terminal 6 is provided with service by the first base station 2. Therefore, the second terminal 6 replies to the first mobile terminal 5 indicating that it is prepared to relay signals between the first terminal 5 and the first base station 2 (step S4).

The first terminal 5 sends information relating to the identity of the source and destination terminals, namely the first and third terminals 5, 7 respectively, to the second terminal 6 over the subsidiary network (step S5). The second terminal 6 sends a message to the server 4, through the first base station 2 (FIG. 1) via the network 1 (FIG. 1) (step S6). The message includes information relating to the identity of the source and destination terminals and the identity of the relay terminal. The server 4 sends a message to the third terminal 7 indicating that the first terminal 5 wishes to establish a connection (step S7). In this example, it is assumes that the third terminal 7 is provided with service by the second base station 3.

If the third terminal 7 agrees to the connection with the first terminal 5, it sends an acknowledgement to the server 4 (step S8). The server 4 thereafter starts a timer (step S9). The acknowledgement is transmitted through the network 1 to the second terminal 6 (step S10), which in turn transmits the acknowledgement through the subsidiary network to the first terminal (step S11). A channel between the first and third terminals 5, 7 is opened allowing the terminals 5, 7 to communicate (step S12).

Thus, the first and third terminals 5, 7 communicate using the second terminal 6 as a relay. The routing module 18 of the second terminal 6 is responsible for directing data received by the first wireless interface 12 and feeding it to the second wireless interface 15 and vice versa.

The user of the second terminal 6 may still able to make and receive calls or send and receive data even while being used as a relay by the first terminal 5. This can be achieved using time division multiple access (TDMA), wherein TDMA slots are allocated for the terminal's own use and different TDMA slots are allocated for use by another terminal. It will be appreciated that the second terminal 6 may be able to relay signals for a plurality of terminals simultaneously.

Another process by which the second mobile terminal 6 is used to relay signals between the first mobile terminal 5 and the first base station 2 will now be described. In this case, a connection is initiated by the third terminal 7.

Figure 7:
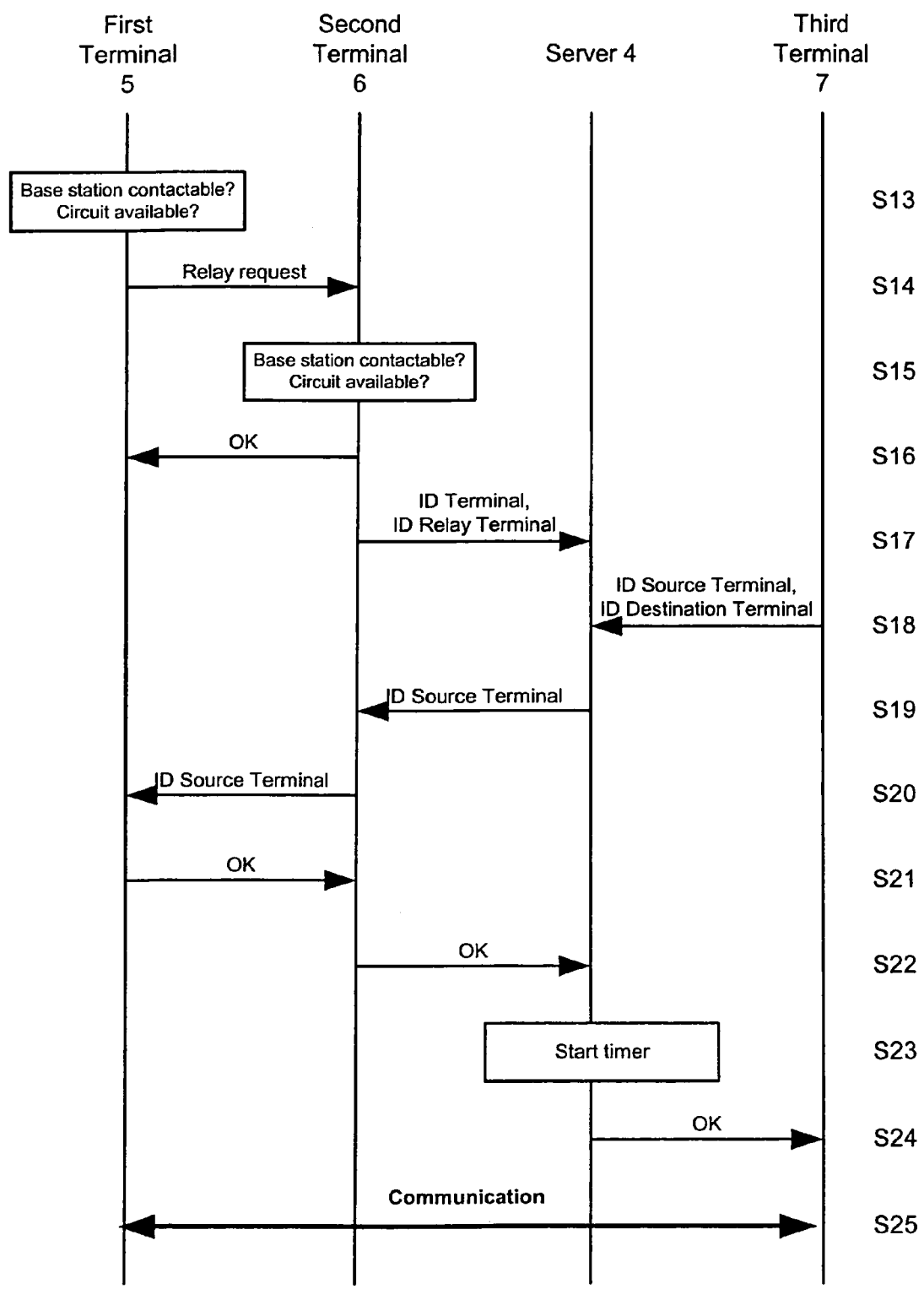
FIG. 7 is a process flow diagram showing a second connection procedure.

Referring to FIG. 7, the first mobile terminal 5 checks whether it is can be serviced by the mobile communications network 1. The first terminal 5 establishes whether a base station 2, 3 is contactable. It may also check whether a communication channel is available (step S13). If no base station 2, 3 is contactable, the first mobile terminal 5 establishes whether another mobile terminal 6, 7, 8 is prepared and able to act as a potential relay. Using the subsidiary mobile communications network (not shown), the first mobile terminal 5 establishes a connection with the second mobile terminal 6 and sends a relay request (step S14). The second mobile terminal 6 establishes whether a base station 2, 3 is contactable and, if so, whether a communication channel is available (step S15). In this case, the second mobile terminal 6 is provided with service by the first base station 2. Therefore, the second terminal 6 replies to the first mobile terminal 5 indicating that it is prepared to relay signals between the first terminal 5 and the first base station 2 (step S16). The second terminal 6 notifies the server 4 that signals intended for the first terminal 5 can be directed through the second terminal 6 (step S17). This is stored in the relay information table 34 (FIG. 5).

The first terminal 5 can perform this check periodically, for example every few seconds. Alternatively, the terminal 5 can send a relay request through the subsidiary network as soon as it detects that it is no longer provided with service by the network 1.

The third mobile terminal 7 attempts to establish contact with the first mobile terminal 5 through the network 1. Thus, in this case the third mobile terminal 7 is deemed to be the source terminal and the first mobile terminal 5 is deemed to be the destination terminal. The third terminal 7 transmits a message including information relating to the identity of the source and destination terminals to the server 4 using the network 1 (step S18). The server 4 looks-up who is relaying signals to the first terminal 5 in the relay information table 34. The sewer 4 thereafter sends a message, indicating that the third terminal 7 wishes to establish a connection with the first terminal 5, to the second terminal 5, through the network 1 (step S19). The second terminal 6 relays the message to the first terminal 5 using the subsidiary network (step S20).

If the first terminal 5 agrees to the connection with the third terminal 7, it sends an acknowledgement to the server 4 via the second terminal (steps S21 & S22). The server 4 starts a timer (step S23) and transmits the acknowledgement to the third terminal 7 (step S24). A channel between the first and third terminals 5, 7 is opened allowing the terminals 5, 7 to communicate (step S25).

The processes described earlier are concerned with establishing a communication between the first and third terminals 5, 7. Processes by which communication is ended by any of the terminals 5, 6, 7 involved will now be described.

Figure 8:
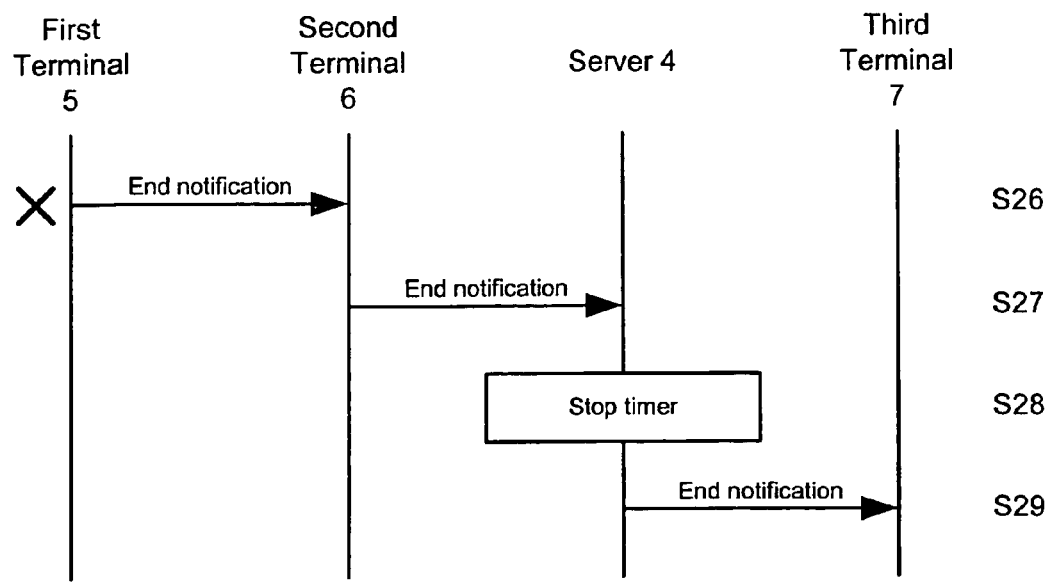
FIG. 8 is a process flow diagram showing a first procedure by which communication is terminated.

Referring to FIG. 8, if the first terminal 5 ends communications, it sends an end notification message to the second terminal 6 over the subsidiary network (step S26). The second terminal 6 passes on this message to the server 4 (step S27). The second terminal 6 can also send other information relating to its use as a relay, such as time spent relaying, number of packets relayed, amount of power consumed etc. The server 4 stops it timer and notifies the third terminal that communication has ended (step S29).

Figure 9:
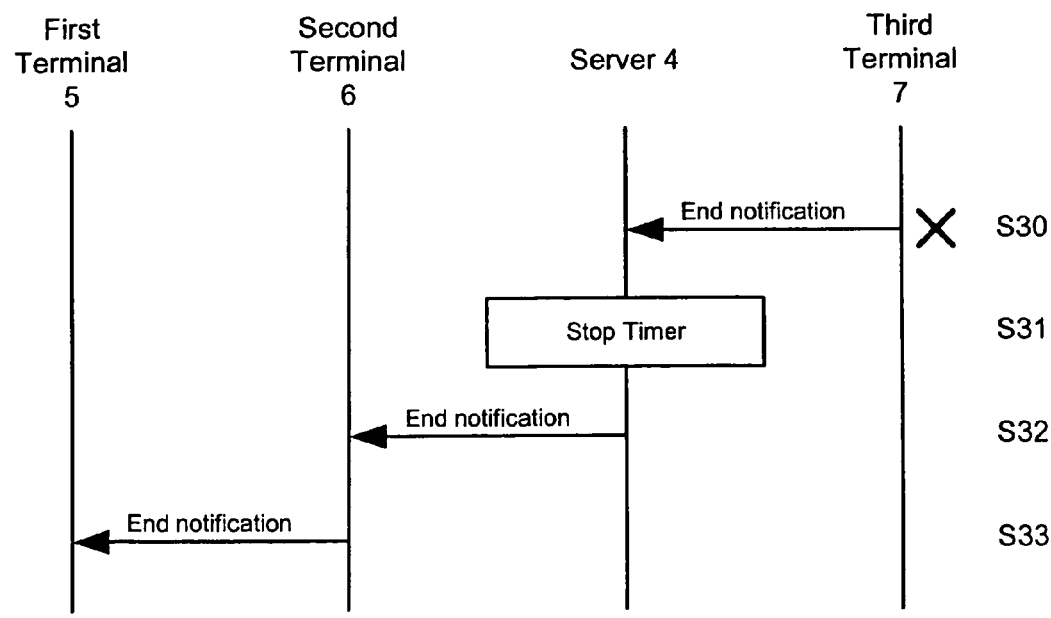
FIG. 9 is a process flow diagram showing a second termination procedure.

Referring to FIG. 9, if the third terminal 7 ends communication, it sends an end notification message to the server 4 (step S30). The server 4 stops its timer and passes on this message to the second terminal 6 (step S31). The second terminal 6 then notifies the first terminal 31 that communication has ended (step S32). Optionally, the second terminal 6 can return a message to the server 4 with information relating to its use as a relay.

Figure 10:
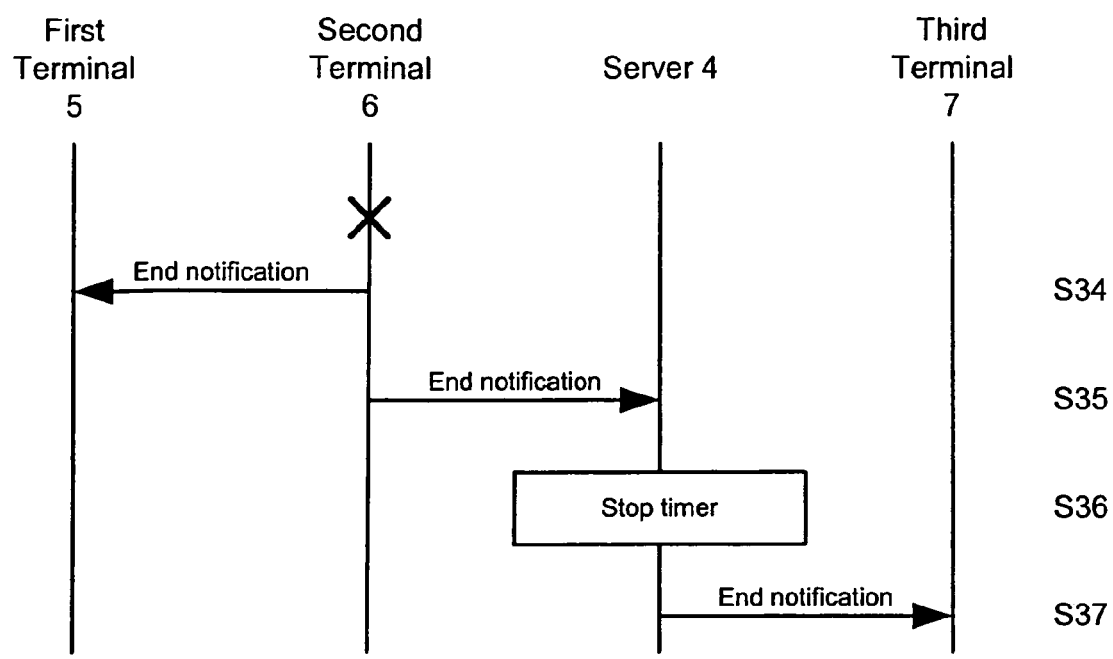
FIG. 10 is a process flow diagram showing a third termination procedure.

Referring to FIG. 10, if the second terminal 6 ends communication, it sends an end notification message to the first terminal 5 (step S34) and also to the server 4 (step S35). As above, the second terminal 6 can include information in the message relating to its use as a relay.

When the server 4 stops its timer or receives information relating to a relay terminal it updates the user database 30 (FIG. 4), for example adding communication charges to the first terminal's account and adding relay points to the second terminal's account.

Figure 11:
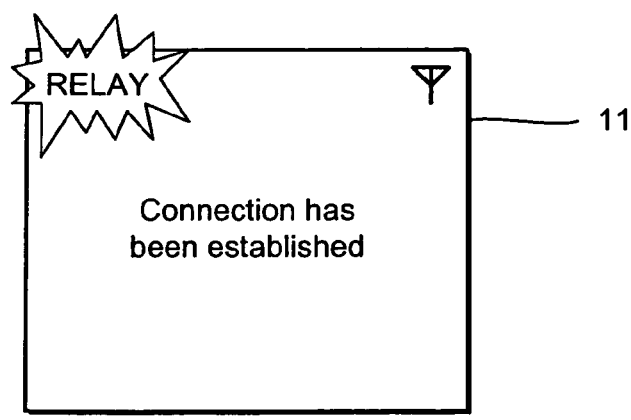
FIG. 11 shows a display of a mobile terminal whose signals are being relayed by another terminal.

Referring to FIG. 11, whenever a terminal 5, 6, 7, 8 uses another terminal as a relay, the display 10 indicates this fact. The relay terminal may also indicate that it is being used as a relay.

Referring again to FIG. 2, each mobile terminal 5, 6, 7, 8 may optionally be provided with a relay management module (not shown). This allows either the user or the terminal itself to choose whether the terminal can be used as a relay. For example, the user can select an option in a menu indicating that they are prepared to allow their terminal to be used. In another example, relay may be permitted provided there is sufficient battery charge.

In the embodiment described earlier, only one terminal is used as a relay. However, more than one terminal can be used.

A process by which the second and fourth mobile terminals 6, 8 are used to relay signals between the first mobile terminal 5 and the first base station 2 will now be described.

Figure 12:
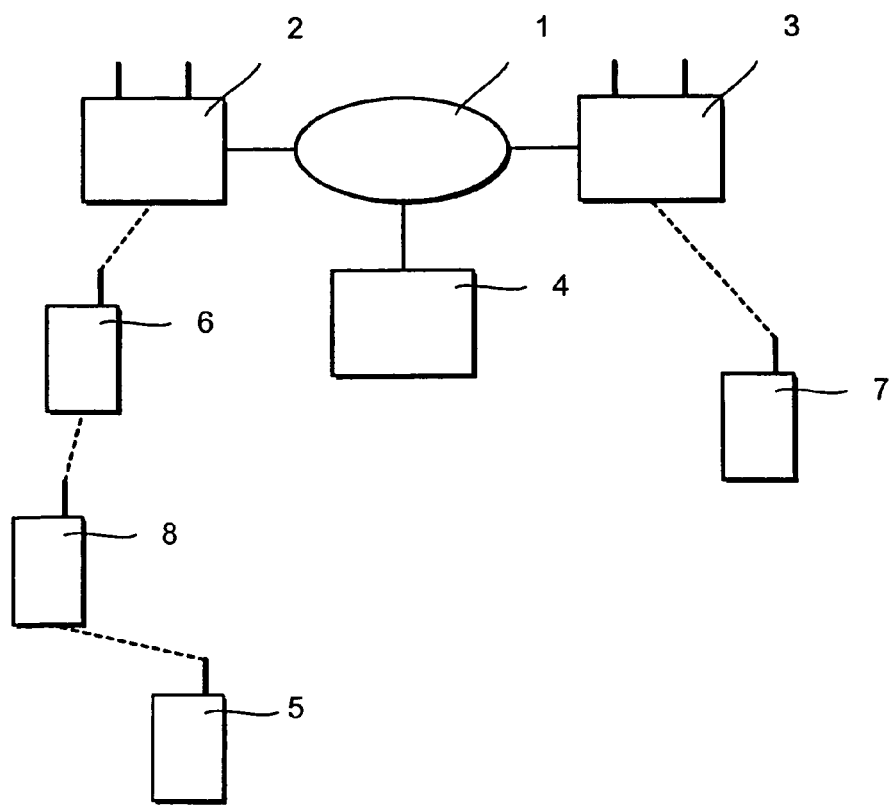
FIG. 12 shows a mobile communications network and mobile terminals according to a second embodiment of the present invention and FIG. 13 is a process flow diagram showing a procedure by which a first terminal, using two terminals as relays, is connected to another terminal.
Figure 13:
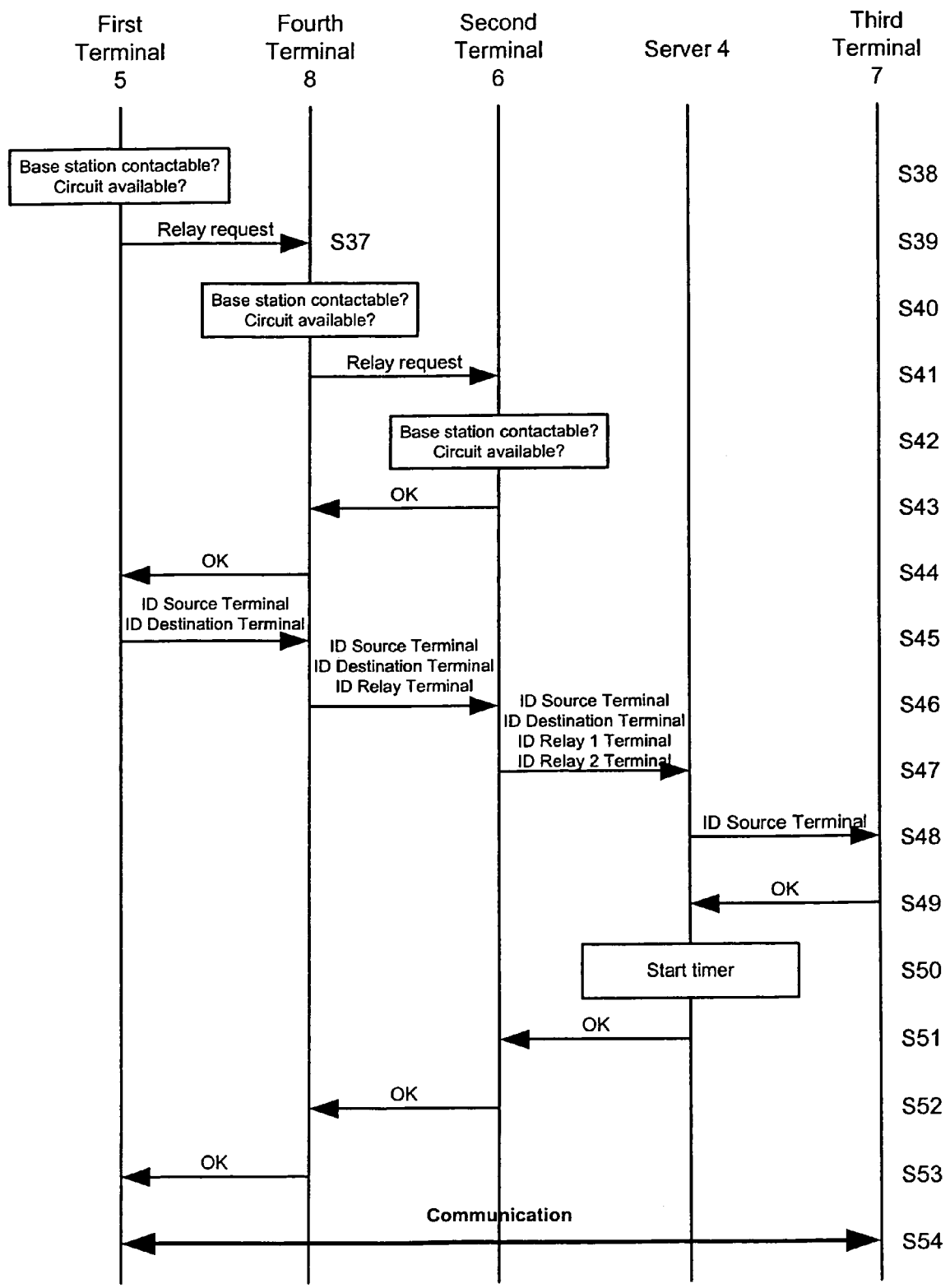

Referring to FIGS. 12 and 13, the first mobile terminal 5 attempts to establish contact with the third mobile terminal 7 through the mobile communications network 1. The first terminal 5 establishes whether a base station 2, 3 is contactable and, if so, whether a communication channel is available (step S38). If either limb of this test fails, then the first mobile terminal 5 establishes whether another mobile terminal 6, 7, 8 is prepared and able to act as a relay. Using the second mobile communications network (not shown), the first mobile terminal 5 establishes a connection with the fourth mobile terminal 8 and sends a relay request (step S39). The fourth mobile terminal 8 establishes whether a base station 2, 3 is contactable and, if so, whether a communication channel is available (step S40). In this case, the fourth mobile terminal 8 is not provided with service. Therefore, still using the second mobile communications network (not shown), the fourth mobile terminal 8 establishes a connection with the second mobile terminal 7 and sends a relay request (step S41). The second mobile terminal 6 establishes whether a base station 2, 3 is contactable and, if so, whether a communication channel is available (step S42). In this case, the second mobile terminal 6 is provided with service by the first base station 2. The second terminal 6 replies to the fourth mobile terminal 8 indicating that it is prepared to relay signals between it and the first base station 2 (step S43). In turn, the fourth terminal 8 replies to the first terminal 5 indicating that it is able to relay signals between it and the first base station (step S44).

The first terminal 5 sends information relating to the identity of the source and destination terminals, namely the first and third terminals 5, 7 respectively, to the fourth terminal 6 (step S45). The fourth terminal 6 sends a message to the second terminal 6 (step S46). The message includes information relating to the identity of the source and destination terminals and the identity of a first relay terminal, namely the fourth terminal 8. The second terminal 8 sends a message to the server 4 (step S47). The message includes information relating to the identity of the source and destination terminals, the identity of the first relay terminal and identifies itself as a second relay terminal.

The server 4 sends a message to the third terminal 7 indicating that the first terminal 5 wishes to establish a connection (step S48). If the third terminal 7 agrees to the connection with the first terminal 5, it sends an acknowledgement to the server 4 (step S49). The server 4 thereafter starts a timer (step S50). The acknowledgement is transmitted through the network 1 to the second terminal 6 (step S51), which in turn transmits the acknowledgement through the second network (not shown) to the first terminal 5, via the fourth terminal 6 (steps S52 & 53). A channel between the first and third terminals 5, 7 is opened allowing the terminals 5, 7 to communicate (step S54).

Thus, the first and third terminals 5, 7 communicate using the second and fourth terminals 6, 8 as a relay. The server 4 not only records use of the second terminal 6 as a relay, but also use of the fourth terminal 8.

It will be appreciated that the terminals may be configured to operate according to protocols designed to handle conflicts between two terminals which receive a relay request and which compete to be the relay, for example on a "first come-first served" basis. The terminal may be configured to search for the shortest route between a terminal and a base station.

If two or more relay routes are available to a terminal, then the terminal can store these routes, including information regarding the identity of relays, in a routing table. The terminal chooses a route and communicates with a base station. However, should transmission through the chosen route fail, for example due to relocation of the relay or introduction of an obstacle, the terminal can select another route.

It will be appreciated that both the source and destination terminals may benefit from using relays. Thus, coverage may be extended to the source terminal by one or more relay terminals, while coverage may also be extended to an intended destination terminal by one or more other relay terminals.

It will be appreciated that many modifications may be made to the embodiment hereinbefore described. For example, any type of mobile communications networks may be used.

The invention claimed is:

1. A mobile communication network comprising a first, a second and a third mobile terminals, a server for storing communication charge information for each user of said mobile terminals, and a first mobile communication network for relaying communication signals between mobile terminals, wherein:

each of said first, second and third mobile terminals has a first wireless interface for exchanging communication signals with said first mobile communication network, each of said first and second mobile terminals has a second wireless interface for exchanging communication signals with each other through a second mobile communication network different in communication protocol from said first mobile communication network, and wherein said second mobile terminal operates as a relay for relaying communication signals between said first and third mobile terminals when the first mobile terminal cannot directly communicate with said first mobile communication network and the second mobile terminal is able to communicate with both the first mobile terminal and said first mobile communication network, and said server includes a memory configured to store, in association with a user identifier of a user of said second mobile terminal, communications charges to be charged to the user and a credit value accumulated arising from use of the second mobile terminal as a relay, and adds to the stored credit value a service point which is awarded to the second mobile terminal for relaying the communication signals between said first and third mobile terminals and calculated based on a predetermined criterion.

2. The mobile communication network according to the claim 1, wherein said credit value accumulated in said memory by said server is usable to offset against said communication charges or to increase network access from said second mobile terminal to said first mobile communication network.

3. The mobile communication network according to claim 1, wherein said server has a timer for measuring the use time of a mobile terminal as a relay, the server starts the timer when said third mobile terminal acknowledged a communication request having been transmitted from said first mobile terminal and forwarded to the third mobile terminal through said second mobile terminal and said first mobile communication network, and the server stops the timer when the communication between said first and third mobile terminals was terminated, thereby to calculate said service point to be awarded to said second mobile terminal in accordance with the use time measured with the timer.

4. The mobile communication network according to claim 3, wherein said sever stops said timer when a communication end notification issued by one of said first and second mobile terminals was received or a communication end notification issued by said first mobile terminal and relayed by said second mobile terminal was received.

5. The mobile communication network according to claim 1, wherein said second mobile terminal transmits contribution information relating to its use as a relay to said server when the communication between said first and second mobile terminals is terminated, and said server calculates said service point to be awarded to said second mobile terminal in accordance with the contribution information.

6. The mobile communication network according to claim 5, wherein said contribution information transmitted from said second mobile terminal includes at least one of the length of time the terminal was used as a relay, a number of packets relayed by the terminal, a number of times the terminal was used as a relay, and the amount of power consumed in the relay operation.

7. The mobile communication network according to claim 5, wherein said second mobile terminal transmits said contribution information to said server, in time of forwarding a communication end notification issued by said first mobile terminal to said server, responding to a communication end notification received from said server, or issuing a communication end notification for terminating operation as a relay by itself.

* * * * *